(12) United States Patent
Aggarwal et al.

(10) Patent No.: US 11,335,037 B2
(45) Date of Patent: May 17, 2022

(54) SMART PAINTING TOOLS

(71) Applicant: ADOBE INC., San Jose, CA (US)

(72) Inventors: Rishu Aggarwal, Delhi (IN); Ajay Bedi, Himachal Pradesh (IN)

(73) Assignee: ADOBE INC., San Jose, CA (US)

( * ) Notice: Subject to any disclaimer, the term of this patent is extended or adjusted under 35 U.S.C. 154(b) by 67 days.

(21) Appl. No.: 16/781,623

(22) Filed: Feb. 4, 2020

(65) Prior Publication Data
US 2021/0241499 A1 Aug. 5, 2021

(51) Int. Cl.
*G06T 11/00* (2006.01)
*G06T 7/13* (2017.01)
*G06T 7/136* (2017.01)

(52) U.S. Cl.
CPC ............ *G06T 11/001* (2013.01); *G06T 7/13* (2017.01); *G06T 7/136* (2017.01); *G06T 2200/24* (2013.01)

(58) Field of Classification Search
CPC ......... G06T 11/001; G06T 7/136; G06T 7/13; G06T 2200/24
See application file for complete search history.

(56) References Cited

U.S. PATENT DOCUMENTS

| | | | | |
|---|---|---|---|---|
| 6,300,955 B1* | 10/2001 | Zamir | ..................... | G06T 7/194 382/175 |
| 8,406,566 B1* | 3/2013 | Wilensky | ................ | G06T 7/194 382/173 |
| 9,098,926 B2* | 8/2015 | Quan | ..................... | G06T 15/04 |
| 2004/0189645 A1* | 9/2004 | Beda | ....................... | G06F 9/545 345/473 |
| 2005/0001854 A1* | 1/2005 | Schuster | .............. | G06T 11/001 345/639 |
| 2007/0146325 A1* | 6/2007 | Poston | .................... | G06F 3/038 345/163 |
| 2013/0120426 A1* | 5/2013 | DiVerdi | ............... | G06T 11/203 345/589 |
| 2013/0301910 A1* | 11/2013 | Mel | ........................ | G06T 7/143 382/159 |

(Continued)

OTHER PUBLICATIONS

M. Jayasree, et al., "An Enchanced Block Based Edge Detection Technique Using Hysteresis Thresholding," Signal & image Processing: An international Journal (SIPIJ) Voi. 9, No. 2, Apr. 2018 (Year: 2018).*

(Continued)

*Primary Examiner* — Michael Le
(74) *Attorney, Agent, or Firm* — F. Chau & Associates, LLC

(57) ABSTRACT

A method of automatically computing tool properties of a virtual paint brush includes obtaining an edge map from a digital image, wherein boundaries of objects in the image are detected, computing contours for the edge map, receiving a brush stroke of the virtual paint brush from a user at a point on a contour, and finding an object boundary that corresponds to the contour that received the brush stroke, computing a tangential slope of the object boundary at the point of the brush stroke, adjusting tool properties of the virtual paint brush based on a change in the tangential slope of the object boundary, and visually displaying the adjusted tool properties dynamically while the user is moving brush strokes around the object boundaries.

19 Claims, 11 Drawing Sheets

(56) References Cited

U.S. PATENT DOCUMENTS

| | | | |
|---|---|---|---|
| 2015/0221070 A1* | 8/2015 | Winnemoeller | G06T 11/001 |
| | | | 382/203 |
| 2018/0260984 A1* | 9/2018 | Severenuk | G06V 30/32 |
| 2018/0365813 A1* | 12/2018 | Leong | G06T 7/11 |

OTHER PUBLICATIONS

M. Jayasree, et al., "An Enhanced Block Based Edge Detection Technique Using Hysteresis Thresholding," Signal & Image Processing: An International Journal (SIPIJ) vol. 9, No. 2, Apr. 2018 (Year: 2018).*

M. Jayasree, et al., "An Enchanced Block Based Edge Detection Technique Using Hysteresis Thresholding," Signal & Image Processing: An International Journal (SIPIJ) vol. 9, No. 2, Apr. 2018.

* cited by examiner

SMART PAINTING TOOLS

BACKGROUND

1. Technical Field

Embodiments of the disclosure are directed to digital image processing, specifically to methods for automatically computing and dynamically changing painting tool properties, such as tip size and direction, and dynamically applying them while a user is moving brush strokes around object boundaries in a digital image.

2. Discussion of the Related Art

A raster graphics editor allows users to interactively create and edit images on a computer, and typically includes painting tools, such as a paint brush tool, a pencil tool, a color replacement tool, a healing brush tool, a spot healing brush tool, an eraser tool, a burn tool, a blur tool, a smudge tool, etc. However, before using one of these tools, a user sets custom settings for the tool. There are many settings which a user can set before painting, such as selecting/creating/Importing a tip, changing a color mode, opacity etc. While most of these settings are one-time settings that are generally set before creating or editing a drawing or image, there are some tool properties which are dynamic in nature and need to be changed and adjusted multiple times based on the complexity of the drawing, such as a brush's painting direction and size.

SUMMARY

According to an embodiment of the disclosure, there is provided a method of automatically computing tool properties of a virtual paint brush, including obtaining an edge map from a digital image, wherein boundaries of objects in the image are detected, computing contours for the edge map, receiving a brush stroke of the virtual paint brush from a user at a point on a contour, and finding an object boundary that corresponds to the contour that received the brush stroke, computing a tangential slope of the object boundary at the point of the brush stroke, adjusting tool properties of the virtual paint brush based on a change in the tangential slope of the object boundary, and visually displaying the adjusted tool properties dynamically while the user is moving brush strokes around the object boundaries.

According to another embodiment of the disclosure, there is provided a system for automatically computing tool properties of a virtual paint brush, including a platform that includes hardware and software resources that connects over a network to at least one computing device remote from the platform. The platform is configured to receive a brush stroke of the virtual paint brush at a point on a digital image from the network, find an object boundary in the digital image that corresponds to the point of the brush stroke by marking the point that received the brush stroke as a base region and scanning a region that surrounds the base region, compute a tangential slope of the object boundary at the point of the brush stroke, adjust tool properties of the virtual paint brush based on a change of the tangential slope of the object boundary, transmit data representing the digital image and the adjusted tool properties of the virtual paint brush over the network to the at least one computing device, and repeat said steps of computing a tangential slope and adjusting tool properties when a new brush stroke of the virtual paint brush is received from the network.

According to another embodiment of the disclosure, there is provided a method of automatically computing tool properties of a virtual paint brush, including receiving a brush stroke of the virtual paint brush from a user at a point, and finding an object boundary that corresponds to the point of the brush stroke, computing a tangential slope of the object boundary at the point of the brush stroke, and computing tool properties of the virtual paint brush based on changes in the object boundaries, wherein tool properties of the virtual paint brush include a brush tip size and a brush tip rotation angle. Automatically computing the brush tip size comprises finding a maximum enclosing rectangle at a point when the user has performed a mouse down event, wherein the maximum enclosing rectangle is that which can fit object boundaries that surround the point, where dimensions of the enclosing rectangle are in a same aspect ratio as a preset pattern chosen by the user, and where a size of the maximum enclosing rectangle is adjusted by a predetermined number of pixels when the pattern mask extends beyond an object boundary. Automatically computing the brush tip rotation angle comprises computing a difference of a current tangential slope with respect to a previous tangential slope, and rotating a brush tip as the difference is computed by an amount that corresponds to the difference.

DETAILED DESCRIPTION

Exemplary embodiments of the disclosure as described herein generally for automatically computing and dynamically changing painting tool properties and dynamically applying them while a user is moving strokes around object boundaries in a digital image.

Figure 1:
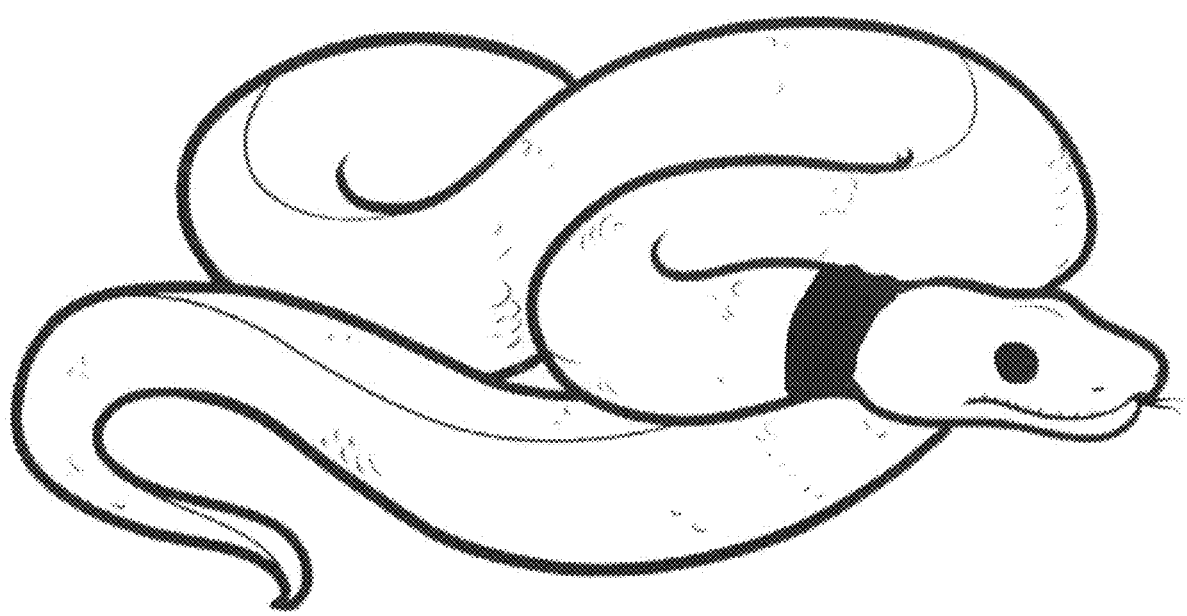
FIG. 1 illustrates a snake to be filled with a pattern, according to an embodiment of the disclosure.
Figure 2:
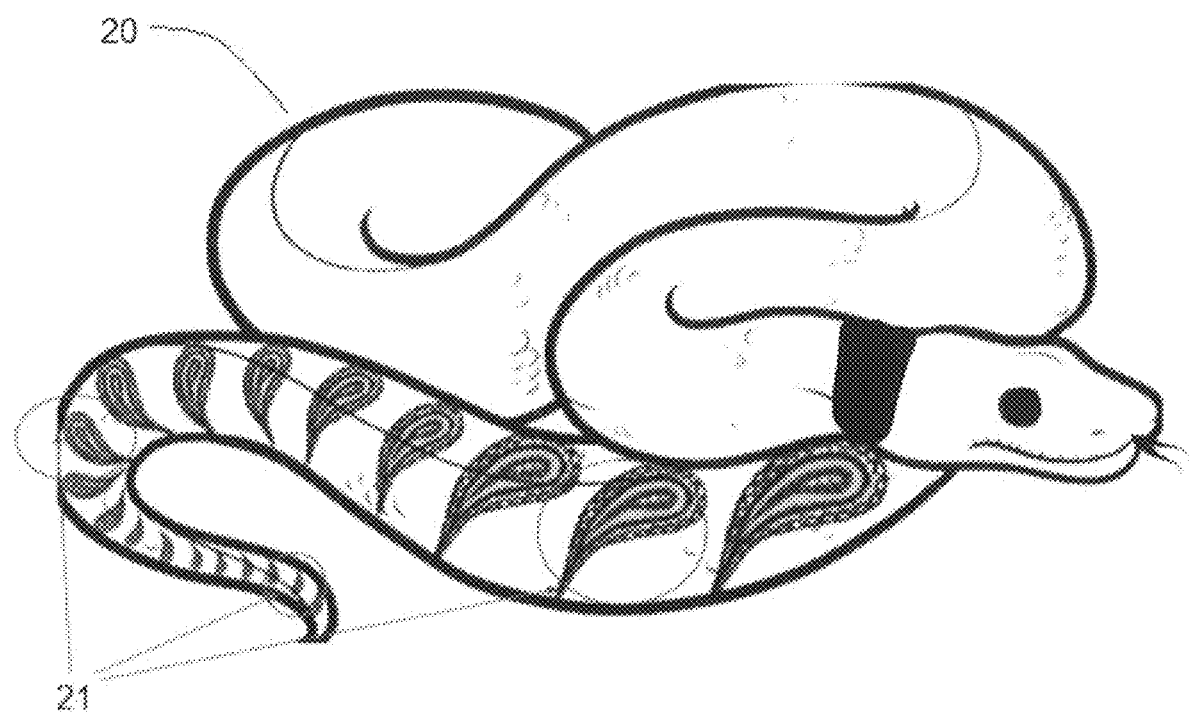
FIG. 2 shows the snake of FIG. 1 filled with a pattern, according to an embodiment of the disclosure.

A typical image design may include many boundaries, and a user frequently desires to paint along these boundaries. Existing manual solutions involve much time and effort to adjust a brush's tool properties as per the design. Currently, to adjust these properties, a user manually enters values in edit boxes, or rotates a radial wheel and uses a scrub bar in a settings panel to respectively set an angle and size. However, the user can only see the effect of the settings after entering values. If the user is working on a complex design, the user will be performing manual adjustments quite frequently. FIGS. 1-2 illustrate an example of painting-tool tip adjustment in the creation of complex designs.

FIG. 1 illustrates a scenario where an artist wants to fill the body of the snake sketch with an artistic pattern. To complete this task, the artist first selects a painting pattern and then sets the color, hardness, opacity, etc., of a paint tool. Once all these prerequisite properties are set, the artist can start painting.

Referring now to FIG. 2, notice that the stroke for each pattern 21 in the snake body 20 is oriented at a different angle and has a different size. Without an automatic method to fill the pattern, the artist adjusts the angle and brush size after each stroke. An artist would expend much manual effort and time to complete the drawing shown in FIG. 2.

Painting-tool tip adjustment is a common workflow and there are numerous other similar use cases, such as painting across boundaries to design a book cover, cartoon sketching, or designing a banner or campaign for a marketing purpose.

Painting tools are available in essentially all image editing applications, for both desktop and mobile platforms, but none of the applications as yet provide a smart and automatic solution to this situation. Thus, a need exists for a smart method where manual intervention is not required to adjust these properties dynamically, where a user can just focus on the painting.

An application according to embodiments of the disclosure detects a nearest object boundary or a user painting-pattern and can automatically adjust a brush tip's size and direction as per the detected object boundary. Embodiments of the disclosure provide a solution that can automatically adjust these tool properties dynamically while a user is moving the painting stroke around the object boundary. In an event where a user manually adjusts any of these properties, such as tip rotation or size, at any point, then the new property value is taken as the base value and adjusted accordingly in further steps. In addition, an application according to embodiments of the disclosure can resolve nested edge ambiguity by learning a user's painting pattern. Embodiments of the disclosure are useful in the case of mobile/touch devices with no available keyboard, where a user needs to change settings repeatedly on a small screen using finger touch inputs. An application according to embodiments of the disclosure allows a user to concentrate on painting without being distracted by frequent and time consuming manual adjustments of the tool properties, thus improving the overall user experience. In addition, an application according to embodiments of the disclosure can easily be extended to non-image editing applications which have painting brushes.

Embodiments of the disclosure can also be applied to painting in 3D space with virtual reality (VR). Current VR headsets provide various tools that would be found in a typical illustration and creative software, such as a paintbrush, an eraser, a spray, watercolor, a pencil, a nib, etc. Current VR headsets programs allow a user to use effects, select styles, change painting textures, brush wetness, nib size, tilt-Angle and color from a huge palette of colors. However, currently these settings are applied by adjusting the canvas with the brush-side trigger kept pulled. Embodiments of the disclosure allow these tools to be adjusted automatically on the fly without requiring the user to change them again and again while painting with a dynamic brush on a virtual palette.

The following terms are used throughout the present disclosure:

The term "image" refers to multi-dimensional data composed of discrete image elements, such as pixels for 2-dimensional images. For a 2-dimensional image, the domain of the image is typically a 2-dimensional rectangular array, wherein each pixel can be addressed with reference to a set of 2 mutually orthogonal axes. The terms "digital" and "digitized" as used herein will refer to images, as appropriate, in a digital or digitized format either created by hand on a graphics editor or acquired via a digital acquisition system or via conversion from an analog image. An image can be a grayscale image, in which each pixel is associated with a single intensity value, or a color image, in which each pixel is associated with a plurality of color intensity values.

The term "object boundary" refers to the edge of an object in a digital image.

The term "edge map" refers to a grayscale image of object boundaries of objects in a digital image.

The term "contour" refers to a curve in the edge map that connects points in the edge map with a same intensity value. Contours need not form closed curves.

The term "tangential slope" refers to the slope of a tangent to a point on a contour or an object boundary.

The term "virtual paint brush" refers to a simulated paint brush that is controlled by a user using an input device such as a mouse, stylus or fingertip to mark strokes in a digital image. The virtual paint brush need not be visible to the user. The strokes marked in the image are not particularly limited, and can be any type of mark or pattern supported by the image editing application.

The term "tool properties" refers to the size of a virtual paint brush and the rotation angle of the virtual paint brush, which is the angle of the virtual paint brush with respect to tangential slope of a point on a contour or object boundary.

The term "maximum enclosing rectangle" refers to a rectangle that can fit within object boundaries that surround a virtual brush stroke location.

The term "automatically computing tool properties" refers to the ability to compute tool properties in real-time as a user enters brush strokes in the digital image. The computation includes use of the maximum enclosing rectangle about the point of the virtual brush stroke or the tangential slope at the point of the virtual brush stroke.

The term "pattern mask" refers to a visual pattern selected by a user from a panel, or created by the user, for entry into the digital image.

The term "stroke pattern" refers to a brush shape chosen by the user and marked by the virtual paint brush tip.

Figure 3:
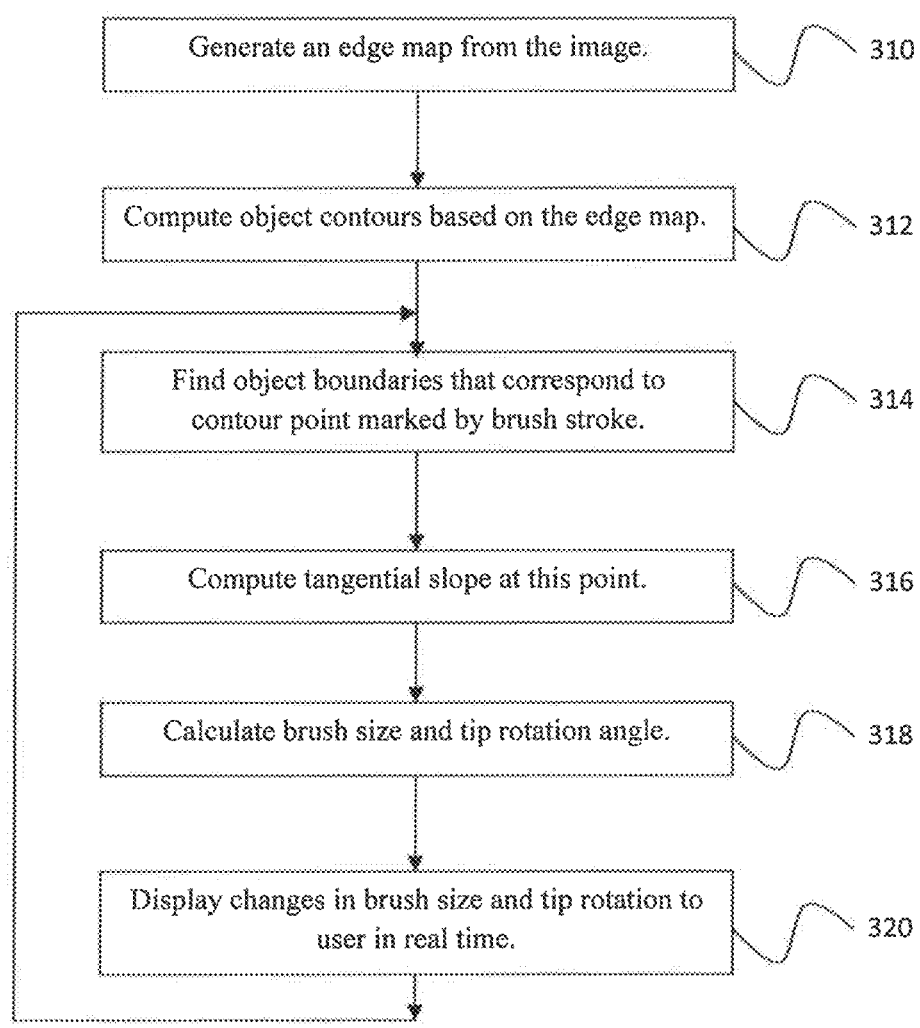
FIG. 3 is a flowchart of a method according to an embodiment of the disclosure.

FIG. 3 is a flowchart of a method according to an embodiment for automatically computing and dynamically changing painting tool properties, and dynamically applying them while a user is moving brush strokes around object boundaries in a digital image. Referring now to the figure, and given an existing image, which may be a color image, a method begins at step 310 by generating an edge map from the image. According to an embodiment, edges are found using a Canny edge detector modified to subdivide the image into smaller sub-images, and running the Canny edge detector in each sub-image. An exemplary, non-limiting sub-image size is 16×16 pixels. Instead of using a common threshold value for the whole image, different thresholds are set in each block for converting to edges based on a histogram of gradient magnitudes computed for each block.

Figure 4:
FIG. 4 is the grayscale edge map image output by the edge detector, according to an embodiment of the disclosure.

An exemplary modified Canny edge detector is disclosed in Jayasree, et al., "An Enhanced Block Based Edge Detection Technique Using Hysteresis Thresholding", Signal & Image Processing: An International Journal (SIPU), Vol. 9, No. 2, April 2018, and this reference discloses how to set different thresholds for each block. The output of the edge detector is a grayscale image with lines and points representing the edges, where the marked edges are as close as possible to the edges in the real image. FIG. 4 is a grayscale edge map image output by the edge detector.

In addition, according to an embodiment, object contours are computed at step 312 based on the edge map, so that coordinate information of all points in the object boundaries can be recorded and cached. Contours are computed by connecting points in the edge map with asame intensity value, as described above. Nested contours are also computed.

According to an embodiment, when a user marks its first stroke on the image with the brush, the object boundaries that correspond to the contour marked by the brush stroke are found at step 314 by scanning the surrounding region and marking the object boundary point nearest to the contour as a base region. The base region is the starting point of the brush stroke, and parameters calculated at this time, such as the edge map and the contours, are saved as base parameters. If a brush stroke is received between contours, the contour nearest to the brush stroke is considered. If the user lifts the brush and starts marking strokes at a different point, new region parameters are calculated and saved as base parameters.

Figure 5A:
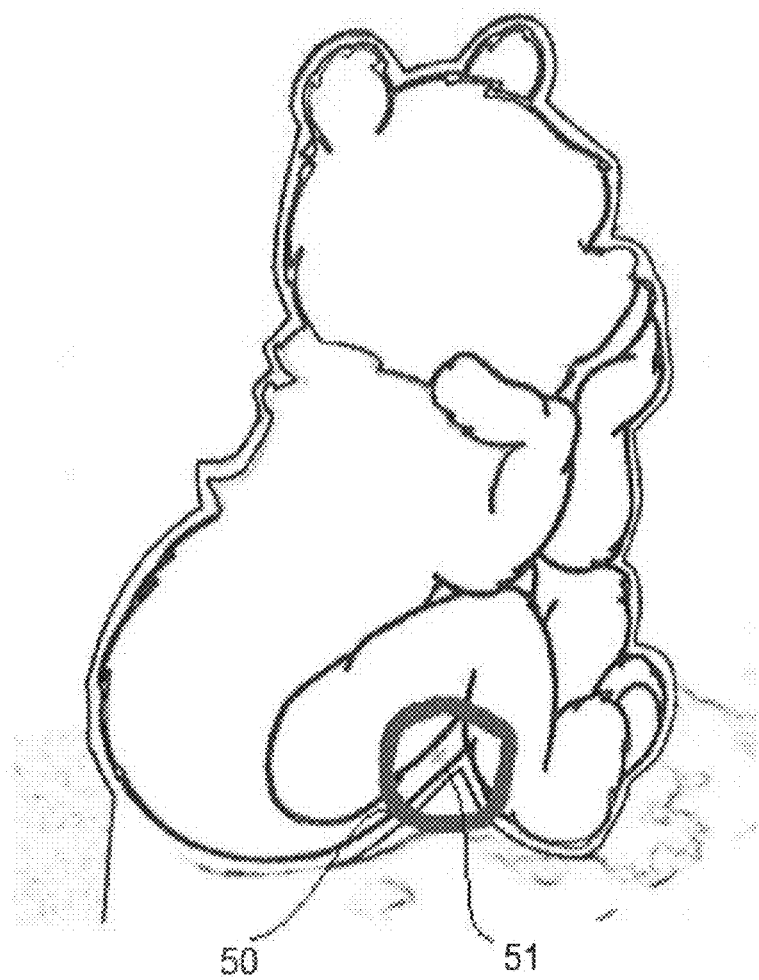
FIG. 5A is an edge map image with a circled region that corresponds to where a user has marked the original image.
Figure 5B:
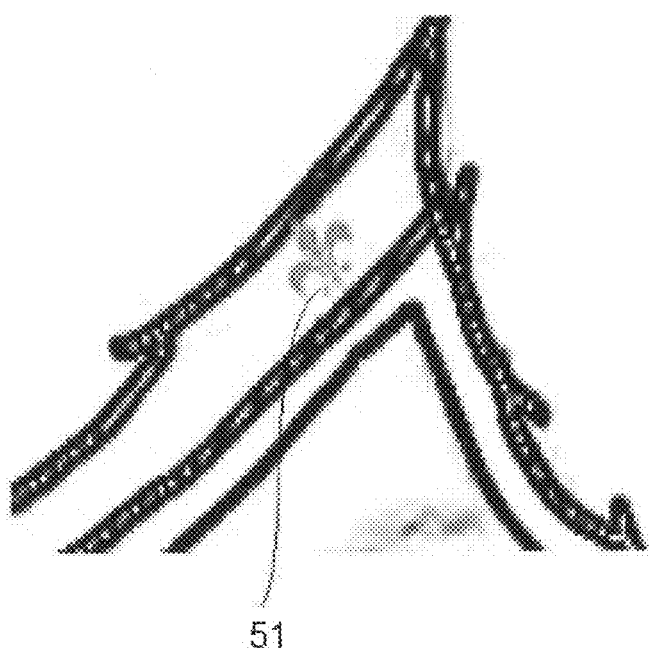
FIG. 5B is an enlargement of the circled region showing the mark of the user, according to an embodiment of the disclosure.

FIG. 5A is an edge map image with a circled region 50 that corresponds to where a user has marked 51 the original image, and FIG. 5B is an enlargement of the circled region showing the mark 51 of the user, which is set as the base for calculating a slope. Then, at step 316, the tangential slope is computed at this point. Let the base slope be represented as S(b), where b is the point. The tangential slope would be based on finite differences of point b and its nearest neighbor points on either side of point b on the contour that received the brush stroke.

At step 318, according to an embodiment, tool properties such as size and tip rotation angle are adjusted based on changes in the object boundary, such as the tangential slope of an object boundary or the spacing between adjacent object boundaries.

When a user performs a mouse-down operation by clicking or pressing the left mouse button, or by touching the display screen with a finger or stylus, which corresponds to the user marking a brush stroke, while using a brush tool, new brush properties are computed as follows:

(a) Size: For automatically computing the size of the brush tip, a maximum enclosing rectangle is found at a point when user has performed a mouse down event. A maximum enclosing rectangle is that which can fit within object boundaries that surround the stroke location. The dimensions of the rectangle have the same aspect ratio as a pattern mask chosen by the user. After finding this maximum enclosing rectangle, the pattern mask is set inside this rectangle. If the pattern mask goes beyond the edges, rectangle size is adjusted by a predetermined number of pixels and then same process is repeated. An exemplary, non-limiting predetermined number of pixels is 5 pixels. One side of the maximum enclosing rectangle determines the brush tip size.

Figure 6:
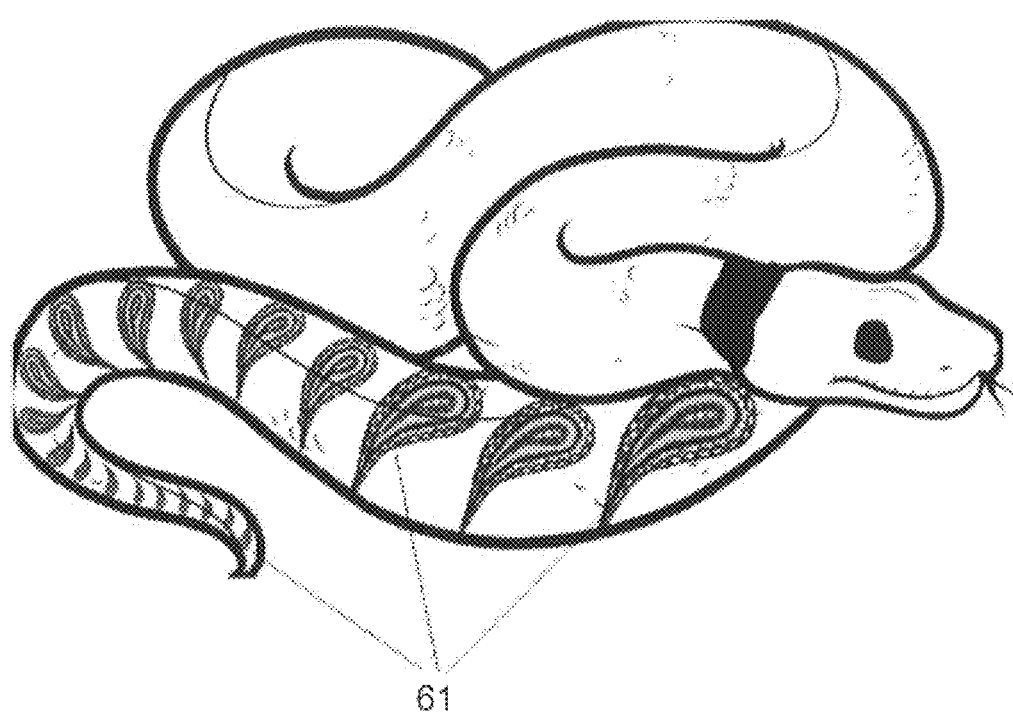
FIG. 6 illustrates an example of where the pattern brush automatically adjusts for size and angle, according to an embodiment of the disclosure.

(b) Tip Angle: the difference of current tangential slope with respect to the tangential slope S(b) computed in step 316 is computed. The tip is rotated accordingly as this change is computed, as shown by the patterns 61 in FIG. 6.

At step 320, the user will see the changes in brush size and rotation angle in substantially real time as these properties are adjusted.

Figure 7A:
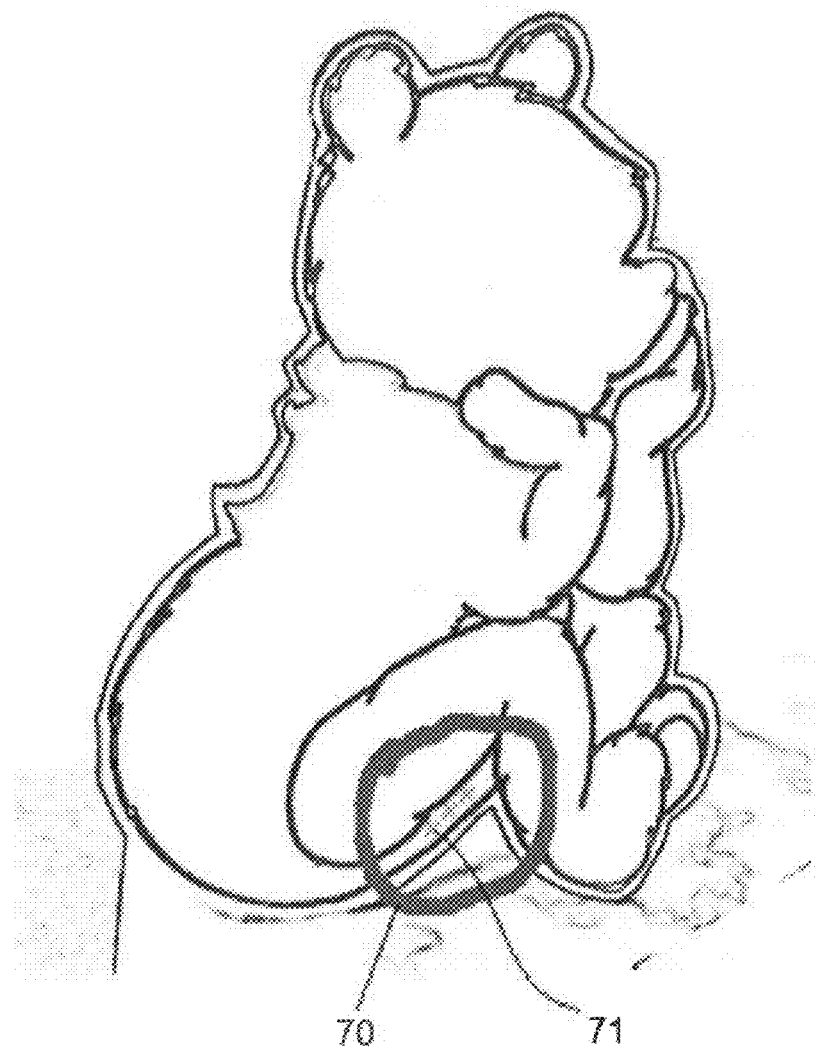
FIG. 7A shows how an additional user stroke would appear in the edge map image.
Figure 7B:
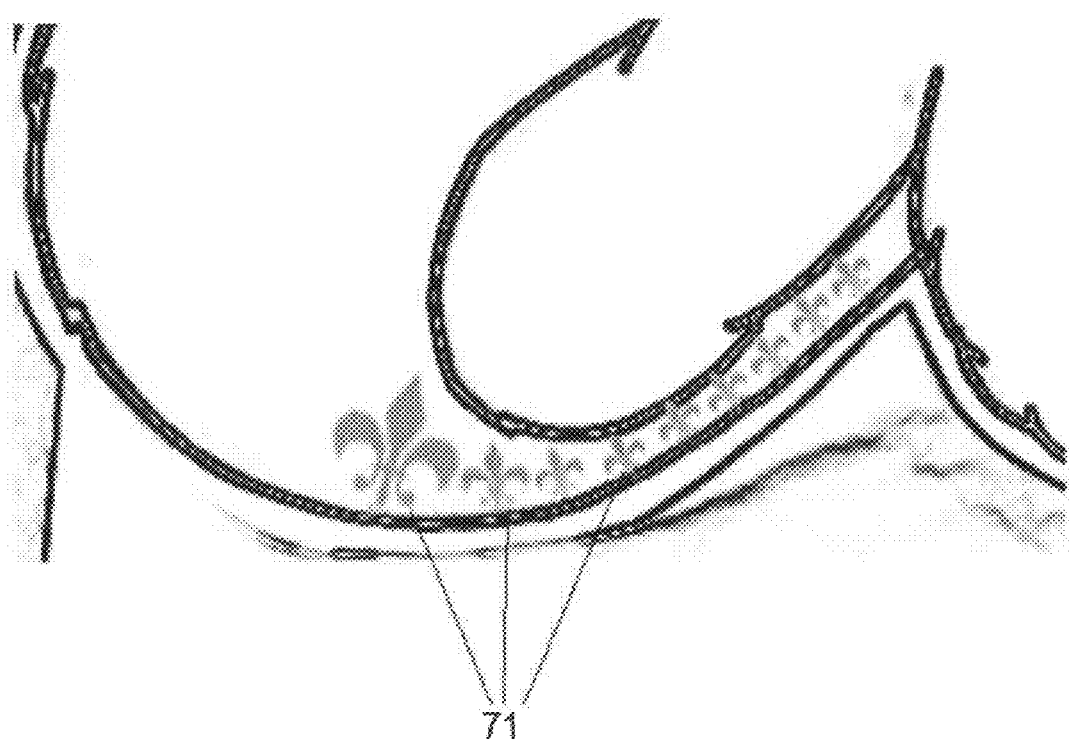
FIG. 7B is an enlargement of the circled region in FIG. 7A, according to an embodiment of the disclosure.

According to an embodiment, as the user keeps stroking at various points, steps 314 to 320 are repeated. The tangential slopes at those points are computed as described with respect to step 316, and the tip rotation angle is changed accordingly as described with respect to step 318. FIG. 7A shows how additional strokes 71 would appear in the edge map image, and FIG. 7B is an enlargement of the circled region 70 in FIG. 7A and the brush strokes 71.

According to an embodiment, when a user manually resets the tip rotation angle, the base angle is reset as computed in Step 316 and then Steps 318-320 are repeated after that.

There may be cases where multiple contours are nested within an object due to complex boundaries/edges inside it. Embodiments of the disclosure can track a user's stroke pattern and automatically map the stroke patterns to a matching contour.

Figure 8:
FIG. 8 shows 2 edges very close to each other, with a user pattern in between, according to an embodiment of the disclosure.

FIG. 8 shows two edges 80 very close to each other. Embodiments of the disclosure can adjust the pattern with the right contour by intelligently tracking the user's pattern 81 from user's previous painting direction as determined from the slope of the contours. A change in the slope of a contour will determine a change in the painting direction.

Note that, according to an embodiment, if a user's brush stroke is the very first brush stroke in an image, before any objects have been created in the image, steps 314 and 316 will not be performed. However, as the user enters brush strokes in the image, edges and contours can be detected and computed.

Figure 9:
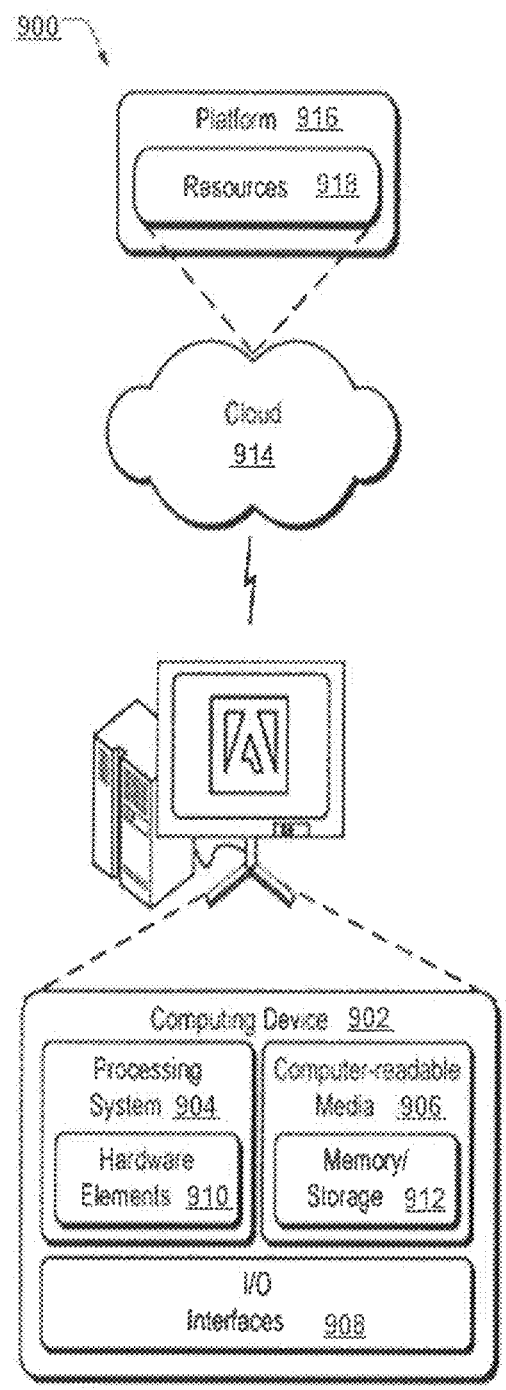
FIG. 9 is a block diagram of a system for implementing a method for automatically computing and dynamically changing painting tool properties according to an embodiment of the disclosure.

FIG. 9 illustrates an example system 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, a stylus, touch functionality (e.g., capacitive or other sensors that are configured to detect physical touch, such as from a finger), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality described herein may be implemented in part on the computing device 902 as well as via the platform 916 that abstracts the functionality of the cloud 914, and on other computing devices that may be interconnected via the platform 916. Data transmitted through the cloud 914 to support the functionality implemented on the platform 916 includes inputs received from the virtual paint brush, and image data needed to visually display the digital image dynamically at a user site, including the adjusted tool properties of the virtual paint brush and the user's pattern mask.

As discussed above, according to an exemplary embodiment of the disclosure, a method is provided for automatically computing and dynamically changing painting tool properties, such as tip size and direction, and dynamically applying them while a user is moving brush strokes around object boundaries in a digital image. In an exemplary embodiment, an edge map is obtained from a digital image, where boundaries of objects in the image are detected, and contours are computed for the edge map. In an exemplary embodiment, a brush stroke of the virtual paint brush is received from a user at a point on a contour, and an object boundary is found that corresponds to the contour that received the brush stroke. In an exemplary embodiment, a tangential slope of the object boundary is computed at the point of the brush stroke. In an exemplary embodiment, tool properties of the virtual paint brush are adjusted based on a change in the tangential slope of the object boundary; and the adjusted tool properties are visually displayed dynamically while the user is moving brush strokes around the object boundaries.

In an exemplary embodiment, the edge map is obtained from the digital image by using a Canny edge detector, and by performing adaptive hysteresis localization and thresholding on the digital image. In an exemplary embodiment, the contours include nested contours. In an exemplary embodiment, finding the object boundary of the contour that received the brush stroke includes scanning a surrounding region and marking a point nearest to the contour that received the brush stroke as a base region. In an exemplary embodiment, additional brush strokes of the virtual paint brush are received, and the tangential slope is computed at those points that received the additional brush strokes. In an exemplary embodiment, a user's stroke pattern is tracked from a previous painting direction of the user and the user's stroke pattern is automatically mapped with a closest matching contour when multiple contours are nested within an object. In an exemplary embodiment, the tangential slope of the object boundary is recomputed at the point of the brush stroke, when a user manually resets a tip rotation angle of the virtual paint brush.

In an exemplary embodiment, tool properties of the virtual paint brush include a brush tip size and a brush tip rotation angle. In an exemplary embodiment, adjusting the brush tip size includes finding a maximum enclosing rectangle at a point when the user has performed a mouse down event, where the maximum enclosing rectangle is that which can fit object boundaries that surround the point, wherein dimensions of the maximum enclosing rectangle are in a same aspect ratio as a preset pattern chosen by the user; and setting a pattern mask inside the maximum enclosing rectangle, and wherein a size of the maximum enclosing rectangle is adjusted by a predetermined number of pixels when the pattern mask extends beyond an object boundary. In an exemplary embodiment, adjusting the brush tip rotation angle includes computing a difference of a current tangential slope with respect to a previous tangential slope, and rotating a brush tip by an amount that corresponds to the difference as the difference is computed.

According to an exemplary embodiment of the disclosure, a system for automatically computing tool properties of a virtual paint brush is provided. In an exemplary embodiment, the system includes a platform that includes hardware and software resources that connects over a network to at least one computing device remote from the platform. In an exemplary embodiment, the platform is configured to receive a brush stroke of the virtual paint brush at a point on a digital image from the network, find an object boundary in the digital image that corresponds to the point of the brush stroke by marking the point that received the brush stroke as a base region and scanning a region that surrounds the base region, compute a tangential slope of the object boundary at the point of the brush stroke, adjust tool properties of the virtual paint brush based on a change of the tangential slope of the object boundary, transmit data representing the digital image and the adjusted tool properties of the virtual paint brush over the network to the at least one computing device, and repeat said steps of computing a tangential slope and adjusting tool properties when a new brush stroke of the virtual paint brush is received from the network.

In an exemplary embodiment, the processing system is further configured to obtain an edge map from the digital image, wherein boundaries of objects in the image are detected, and to compute contours for the edge map, wherein the contours connect points in the edge map with a same intensity value, and wherein the brush stroke of the virtual paint brush is received at a point on a contour. In an exemplary embodiment, when a brush stroke is received between contours, the processing system is further configured to select a contour nearest to the brush stroke as the contour that received the brush stroke.

According to an exemplary embodiment of the disclosure, a method of automatically computing tool properties of a virtual paint brush is provided. In an exemplary embodiment, the method includes receiving the brush stroke of a virtual paint brush from a user at a point, and finding an object boundary that corresponds to the point of the brush stroke, computing a tangential slope of the object boundary at the point of the brush stroke, and computing tool properties of the virtual paint brush based on changes in the object boundaries, wherein tool properties of the virtual paint brush include a brush tip size and a brush tip rotation angle. In an exemplary embodiment, automatically computing the brush tip size comprises finding a maximum enclosing rectangle at a point when the user has performed a mouse down event, wherein the maximum enclosing rectangle is that which can fit object boundaries that surround the point, wherein dimensions of the maximum enclosing rectangle are in a same aspect ratio as a preset pattern chosen by the user, and wherein a size of the maximum enclosing rectangle is adjusted by a predetermined number of pixels when the pattern mask extends beyond an object boundary. In an exemplary embodiment, automatically computing the brush tip rotation angle comprises computing a difference of a current tangential slope with respect to a previous tangential slope, and rotating a brush tip as the difference is computed by an amount that corresponds to the difference.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A method of computing tool properties of a virtual paint brush, the method comprising:
   obtaining an edge map of a digital image, wherein a boundary of an object in the image is detected;
   computing a contour for the edge map;
   receiving a brush stroke of the virtual paint brush from a user at a point on a contour, and finding an object boundary that corresponds to the contour;
   computing a tangential slope of the object boundary at the point of the brush stroke;
   adjusting tool properties of the virtual paint brush based on a change in the tangential slope of the object boundary; and
   visually displaying the adjusted tool properties while the user is moving brush strokes around the object boundaries,
   wherein adjusting tool properties of the virtual paint brush includes adjusting a brush size,
   wherein adjusting the brush size comprises:
      finding a maximum enclosing rectangle at a point when the user has performed a mouse event, wherein the maximum enclosing rectangle is that which can fit object boundaries that surround the point; and
      setting a pattern mask inside the maximum enclosing rectangle, wherein a pattern mask is a visual pattern selected by a user for entry into the digital image.

2. The method of claim 1, wherein the edge map is obtained from the digital image by using a Canny edge detector, and by performing adaptive hysteresis localization and thresholding on the digital image.

3. The method of claim 1, wherein the contour includes nested contours.

4. The method of claim 1, wherein finding the object boundary of the contour comprises scanning a surrounding region and marking a point nearest to the contour that received the brush stroke as a base region.

5. The method of claim 1, further comprising receiving additional brush strokes of the virtual paint brush, and computing the tangential slope at those points that received the additional brush strokes.

6. The method of claim 1, further comprising tracking a user's stroke pattern from a previous painting direction of the user and automatically mapping the user's stroke pattern with a closest matching contour when multiple contours are nested within an object.

7. The method of claim 1, further comprising recomputing the tangential slope of the object boundary at the point of the brush stroke, when a user manually resets a tip rotation angle of the virtual paint brush.

8. The method of claim 1, wherein adjusting tool properties of the virtual paint brush further includes adjusting a brush tip rotation angle.

9. The method of claim 8, wherein adjusting the brush tip size comprises:
   wherein dimensions of the maximum enclosing rectangle are in a same aspect ratio as a preset pattern chosen by the user;
   wherein a size of the maximum enclosing rectangle is adjusted by a predetermined number of pixels when the pattern mask extends beyond an object boundary.

10. The method of claim 8, wherein adjusting the brush tip rotation angle comprises computing a difference of a current tangential slope with respect to a previous tangential slope, and rotating a brush tip by an amount that corresponds to the difference as the difference is computed.

11. A system for computing tool properties of a virtual paint brush, comprising:
    a platform that includes hardware and software resources that connects over a network to at least one computing device remote from the platform,
    wherein the platform is configured to:
       receive a brush stroke of the virtual paint brush at a point on a digital image from the network;
       find an object boundary in the digital image that corresponds to the point of the brush stroke by marking the point as a base region and scanning a region that surrounds the base region;
       compute a tangential slope of the object boundary at the point of the brush stroke;
       adjust tool properties of the virtual paint brush based on a change of the tangential slope of the object boundary;
       transmit data representing the digital image and the adjusted tool properties of the virtual paint brush over the network to the at least one computing device; and
       repeat said steps of computing a tangential slope and adjusting tool properties when a new brush stroke of the virtual paint brush is received from the network,
       wherein tool properties of the virtual paint brush that are being adjusted include a brush tip rotation angle, wherein the brush tip rotation angle is adjusted by computing a difference of a current tangential slope with respect to a previous tangential slope, and rotating a brush tip by an amount that corresponds to the difference as the difference is computed.

12. The system of claim 11, wherein the platform is further configured to obtain an edge map of the digital image, wherein a boundary of an object in the image is detected, and to compute contours for the edge map, wherein the contours connect points in the edge map with a same intensity value, and wherein the brush stroke of the virtual paint brush is received at a point on a contour.

13. The system of claim 12, wherein when a brush stroke is received between contours, the platform is further configured to select a contour nearest to the brush stroke as the contour that received the brush stroke.

14. The system of claim 1, wherein the platform is further configured to visually display on an output interface of one of the at least one computing device the adjusted tool properties dynamically while a user of the one of the at least one computing device is moving brush strokes around the object boundary.

15. The system of claim 11, wherein tool properties of the virtual paint brush that are being adjusted further include a brush tip size.

16. The system of claim 15, wherein adjusting the brush tip size comprises:
  finding a maximum enclosing rectangle at a point when a user has performed a mouse down event, wherein the maximum enclosing rectangle is that which can fit object boundaries that surround the point, wherein dimensions of the maximum enclosing rectangle are in a same aspect ratio as a preset pattern chosen by the user; and
  setting a pattern mask inside the maximum enclosing rectangle, wherein a size of the maximum enclosing rectangle is adjusted by a predetermined number of pixels when the pattern mask extends beyond an object boundary,
  wherein a pattern mask is a visual pattern selected by a user for entry into the digital image.

17. A method of automatically computing tool properties of a virtual paint brush, the method comprising:
  receiving a brush stroke of the virtual paint brush from a user at a point, and finding an object boundary that corresponds to the point of the brush stroke;
  computing a tangential slope of the object boundary at the point of the brush stroke; and
  computing tool properties of the virtual paint brush based on changes in the object boundaries, wherein tool properties of the virtual paint brush include a brush tip size and a brush tip rotation angle,
  wherein automatically computing the brush tip size comprises finding a maximum enclosing rectangle at a point when the user has performed a mouse down event, wherein the maximum enclosing rectangle is that which can fit object boundaries that surround the point, wherein dimensions of the maximum enclosing rectangle are in a same aspect ratio as a preset pattern chosen by the user, wherein a size of the maximum enclosing rectangle is adjusted by a predetermined number of pixels when the pattern mask extends beyond an object boundary, and
  wherein automatically computing the brush tip rotation angle comprises computing a difference of a current tangential slope with respect to a previous tangential slope, and rotating a brush tip as the difference is computed by an amount that corresponds to the difference.

18. The method of claim 17, further comprising:
  obtaining an edge map from a digital image, wherein the object boundaries of objects in the image are detected; and
  computing contours for the edge map,
  wherein the brush stroke of the user is received at a point on a contour.

19. The method of claim 17, further comprising visually displaying the adjusted tool properties dynamically while the user is moving brush strokes around the object boundaries.

* * * * *